United States Patent [19]
Karzijn et al.

[11] Patent Number: 4,769,402
[45] Date of Patent: Sep. 6, 1988

[54] AQUEOUS SOLUTIONS OF RESINOUS COMPOUNDS

[75] Inventors: Willem Karzijn; Petrus G. Kooijmans, both of Amsterdam, Netherlands

[73] Assignee: Shell Oil Company, Houston, Tex.

[21] Appl. No.: 48,208

[22] Filed: May 11, 1987

[30] Foreign Application Priority Data

May 9, 1986 [GB] United Kingdom ............... 8611328

[51] Int. Cl.$^4$ ..................... C08G 59/14; C08L 63/00
[52] U.S. Cl. .................... 523/414; 523/421; 528/96; 528/103; 528/109; 528/117; 528/118; 525/530; 525/533
[58] Field of Search ............... 523/414, 421; 528/96, 528/103, 109, 117, 118; 525/530, 533

[56] References Cited

U.S. PATENT DOCUMENTS

| 3,464,939 | 9/1969 | van Westrenen | 523/414 |
| 3,707,526 | 12/1972 | Gannon | 260/47 EA |
| 3,749,758 | 7/1973 | Gannon | 260/835 |
| 4,029,621 | 6/1977 | Hartman | 523/414 |
| 4,115,361 | 9/1978 | Schulze | 528/117 |
| 4,555,563 | 11/1985 | Hefner | 528/117 |

FOREIGN PATENT DOCUMENTS 1155628 6/1969 United Kingdom .
1556201 1/1977 United Kingdom .

Primary Examiner—C. Warren Ivy

[57] ABSTRACT

Aqueous solutions containing an epoxy resin in which epoxy groups have been replaced with a group $M^+[-CH(OH)-CH_2-X-Ar-NH-C(O)-Q-C(O)-O]^-$ in which M is an alkali metal or onium ion, Q an organic bridging group having 2–3 carbon atoms in the bridge, Ar is arylene, X is S, O, NH, N-alkyl, $SO_2NH$ or $SO_2$N-allyl, and preparation thereof by reacting an N-substituted imide with an epoxy resin and reacting the adduct thus formed with a base in the presence of water.

33 Claims, No Drawings

AQUEOUS SOLUTIONS OF RESINOUS COMPOUNDS

BACKGROUND OF THE INVENTION

This invention relates to water-soluble resin compositions, to aqueous solutions of such resin compositions, and to a process for the preparation of aqueous solutions of water-soluble resins.

It is known that water-soluble derivatives of epoxy resins can be used in aqueous thermosetting coating systems for electrodeposition of coatings onto metals. GB-A-1,556,201, for example, discloses resinous compounds prepared by reacting in the temperature range of from 100° to 150° C. hydroxyl-containing resinous intermediates with sufficient polycarboxylic acid anhydride to produce a resinous compound having an acid value of at least 35 mg KOH/g. The resinous intermediate is prepared by reacting below 150° C. a polyglycidyl ether of a dihydric phenol with a hydroxy-alkane monocarboxylic acid or a mixture thereof with a saturated aliphatic dicarboxylic acid having 4–12 carbon atoms per molecule, the intermediate being made essentially carboxyl-free by the choice of a proper equivalent ratio of components, the use of rather low temperatures, and the use of a catalyst promoting the esterification of epoxy groups with carboxyl groups. The final resinous compounds are then diluted with a lyotropic solvent such as a glycol ether, neutralized with a base and combined with a crosslinking resin. They can then be further diluted with water to make an aqueous solution of a thermosetting coating composition. The films obtained can be cured by action of heat.

Aqueous solutions of these known thermosetting coating compositions tend to deteriorate on storage, giving rise to deposits and corrosion and to inferior physical properties in cured coatings, such as low sterilization resistance, low pasteurization resistance and low solvent resistance. This deterioration is believed to be due at least in part to hydrolysis of ester linkages.

It is therefore an object of the invention to provide an aqueous solution of a resinous compound which has improved storage stability and provides cured coatings having excellent sterilization resistance, pasteurization resistance and solvent resistance.

BRIEF SUMMARY OF THE INVENTION

According to the invention, there is provided an aqueous solution of a resinous compound which comprises an epoxy resin in which the 1,2-epoxy groups have at least in part been replaced with a group represented by the general formula I

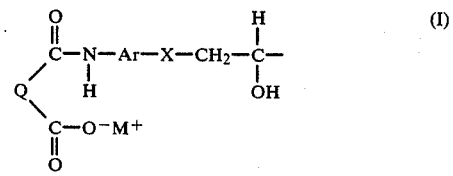

in which M+ is an alkali metal ion or an onium ion, Q is an organic bridging group having 2 or 3 carbon atoms in the bridge, Ar is an arylene group, and X is a sulphur or oxygen atom or a group

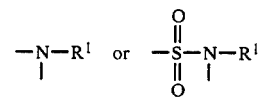

in which R¹ is a hydrogen atom or an alkyl group.

The invention also provides a process for the preparation of an aqueous solution of an epoxy adduct comprising a group represented by the general formula I described above, which process comprises (a) reacting an N-substituted imide having the general formula II

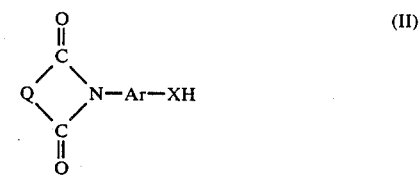

wherein Q, Ar and X have the same meaning as in the general formula I, with an epoxy resin having the general formula III

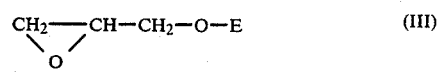

in which E represents the balance of the molecule of the epoxy resin, to provide an epoxy adduct of the general formula IV

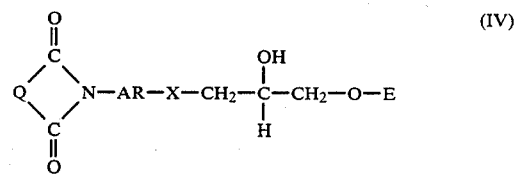

in which Q, Ar and X have the same meaning as in the general formula II and E has the same meaning as in the general formula III, and (b) reacting the epoxy adduct in the presence of water with a base of the general formula M+(OH)− in which M+ has the same meaning as in the general formula I.

Among the alkali metals represented by M+, sodium and potassium are preferred, but more preference is given to onium ions, particularly to ammonium ions, i.e., to ions derived from a nitrogen base. Ammonia was found to be suitable, but preferably the nitrogen base is an amine, more preferably an aliphatic amine. This amine may be primary or secondary but is preferably a tertiary amine. The ammonium ions suitably contain a hydroxyl group bound to a carbon atom to improve the solubility in water of the resinous compounds. Very good results have been obtained with dimethyl-2-methyl-2-hydroxypropylammonium ions. Other examples of suitable amines are 2-amino-2-methyl-1-propanol and 2-dimethylamino-2-methyl-1-propanol. Another example of an onium is a quaternary ammonium ion, for example tetramethylammonium or tetraethylammonium ions. A further example of an onium ion is a sulfonium ion.

The organic bridging group Q preferably has two carbon atoms in the bridge. According to a preferred embodiment of the present invention, Q is a group of the general formula V

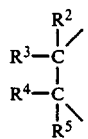 (V)

in which $R^2$, $R^3$, $R^4$ and $R^5$ each individually represent an optionally substituted hydrocarbon group, an optionally substituted hydrocarbonoxy group, a hydroxyl group or a halogen or hydrogen atom. Any hydrocarbon or hydrocarbonoxy group represented by $R^2$, $R^3$, $R^4$ and $R^5$ suitably has less than 13 carbon atoms and may be an aromatic or cycloaliphatic group, but is preferably an alkyl group and more preferably an alkyl group having less than 5 carbon atoms. Very good results have been obtained with methyl groups, particularly when $R^2$ and $R^3$ represent methyl groups and $R^4$ and $R^5$ represent hydrogen atoms.

According to another preferred embodiment of the present invention, Q in the general formula I forms part of a cyclic structure, which may be heterocyclic, but is preferably carbocyclic and, more preferably has 5 or 6, but particularly 6, carbon atoms in the ring. The cyclic structure may have one or two ethylenically unsaturated carbon-carbon bonds in the ring. Q may be a 1,2-phenylene group, but the cyclic structure is preferably an optionally substituted 1,2-cyclohexylene group. Examples of such substituents are alkyloxy groups and halogen atoms; preference is given to alkyl groups, particularly to those having less than 5 carbon atoms. Very good results have been obtained with methyl groups, particularly with a 3-methyl-1,2-cyclohexylene group.

Furthermore, Q in the general formula I may be a group represented by the general formula VI

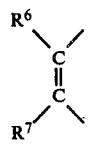 (VI)

in which $R^6$ and $R^7$ have the same meaning as $R^2$ and $R^4$ in the general formula V, or a group

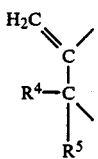 (VII)

in which $R^4$ and $R^5$ have the same meaning as in the general formula V.

Another possibility is Q forming part of a polycyclic structure, which may be a polyimide, as is the case in, for example, a group

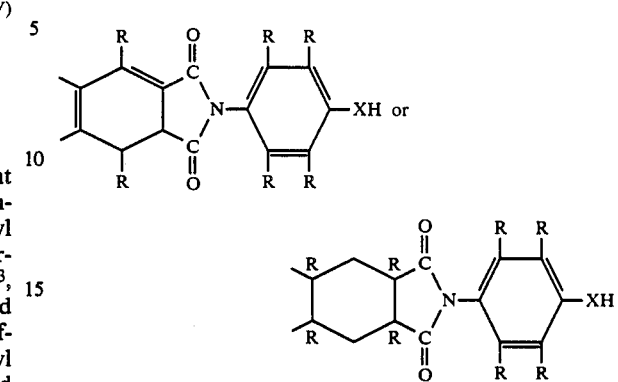

in which two groups each R individually has the same meaning as $R^2$ in the general formula V.

The arylene group Ar in the general formula I may be, for example, a naphthyl or anthryl group, but is preferably a phenylene group. This group may be an o- or m-phenylene group but is preferably a p-phenylene group. The arylene group may be substituted, for example with alkyl or alkyloxy groups, such as those having less than 5 carbon atoms. Very good results have been obtained with unsubstituted arylene groups.

X in the general formula I is preferably an oxygen atom. Any alkyl group present in X preferably has less than 5 carbon atoms and can be, for example, a methyl group.

The epoxy resin of the general formula III may be liquid or solid at ambient temperature and, according to a preferred embodiment of the invention, is a polyglycidyl ether of a polyhydric phenol, more preferably of a dihydric phenol. Most preferred are diglycidyl ethers of dihydric phenols, particularly of 2,2-bis(4-hydroxyphenyl)propane. The general formula of such diglycidyl ethers is

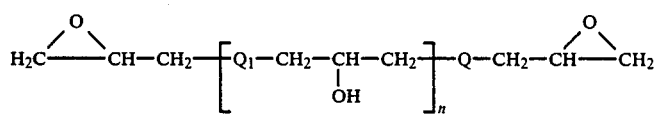

in which $Q_1$ represents the divalent radical obtained by removal of the two H atoms from the OH groups in the dihydric phenol and in which n may have an average value in the range of from 0 to 20. Theoretically, diglycidyl ethers from a dihydric phenol have two terminal glycidyl groups per molecule, but in practice a portion of the terminal groups are not glycidyl groups. The diglydicyl ethers can be further defined by the concentration of epoxy groups, expressed in meq per g. Diglycidyl ethers of diphehylolpropane having 3.5 to 6 meq epoxy groups per g are the so-called "liquid" epoxy resins; at ambient temperature the commercial products are viscous liquids. diglycidyl ethers of diphenylolpropane having 0.2 to 2.5 meq epoxy groups per g are solid resins and usually melt in the range of from 50° to 130° C.

Another example of an epoxy resin which may be used is an epoxidized novolac resin. Epoxidized novolac resins may conveniently be prepared by reaction of a novolac resin with an epihalohydrin, preferably epichlorohydrin, in the presence of a hydrogen halide acceptor, for example an alkali metal hydroxide. Examples are novolac resins of the general formula

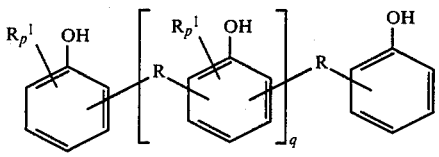

wherein R represents an alkylene, for example $CH_2$, group, $R^1$ represents an alkyl group, for example a methyl, p-tert-butyl, octyl or nonyl group, q and p are numbers having average values $0 < q \leq 6$ and $0 \leq p \leq 2$, or of the general formula

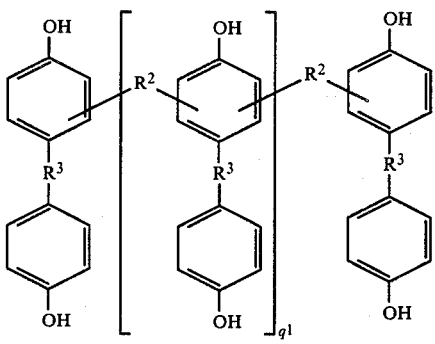

wherein $R^2$ represents an alkylene, for example $CH_2$, group, $R^3$ represents an alkylene, for example $CH_2$ or $C(CH_3)_2$ group, a carbonyl group, an oxygen or sulphur atom and $q^1$ is a number having an average value in the range 0 to 2.

Very good results have been obtained by reacting the compound of the general formula II with a mixture of a polyglycidyl ether of a polyhydric phenol and an epoxidized novolac resin. Any weight ratio polyglycidyl ether to epoxidized novolac resin may be used in this mixture, for example in the range of from 1:100 to 100:1.

In a preferred embodiment, the compound of the general formula II is reacted with a mixture of the epoxy resin and a polyhydric phenol, preferably with 2,2-bis(4-hydroxyphenyl)propane. In this manner, compounds of the general formula IV having a higher molecular weight can be obtained, which usually improves the quality of the resulting cured films. An equivalent ratio epoxy resin to polyhydric phenol can be used which can vary between wide limits, for example between 1:10 and 10:1. If a polyhydric phenol is present, it may be desirable to use epoxy resins containing on average less than two epoxy groups per molecule to avoid gel formation. For example, epoxy resins containing on average more than two epoxy groups per molecule may first be defunctionalized to obtain those having less than two epoxy groups per molecule, for example by reaction with an alkylphenol such as p-octylphenol or p-nonylphenol.

In the preparation of the compound of the general formula IV, reaction between aliphatic hydroxyl groups with epoxy groups should be avoided. This may be achieved by employing an onium salt, for example a quaternary ammonium or phosphonium salt, for example tetramethylammonium chloride or tetraethylammonium chloride, as a catalyst for the reaction of epoxy groups with phenolic hydroxyl groups. The onium salt, for example the quaternary ammonium or phosphonium salts, are preferably employed in amounts from about 0.005 to 0.2% by weight of reactants.

In a suitable embodiment, the compounds of the general formulae II and III and optionally a polyhydric phenol are mixed in the presence of a solvent and an onium salt, for example a quaternary ammonium or phosphonium salt, and reacted until the solid material in the reaction mixture is essentially free from epoxy groups, that is, contains less than 500 and preferably less than 100 meq epoxy per kg.

The compounds of the general formulae II and III are preferably reacted at a temperature in the range of from 60° to 200° C., but temperatures below 60° C. and above 200° C. are not excluded. The reaction is carried out for a period which depends on the temperature and generally lies between 2 and 24 h.

The compounds of the general formulae II and III are reacted in an equivalent ratio of imide to epoxy which is not critical and may vary within wide ranges, for example between 10:1 and 1:10, preferably between 1:2 and 2:1.

The compounds of the general formulae II and III may be reacted, if desired, in the presence of a suitable non-reactive and water-soluble solvent, such as ethers or aliphatic alcohols, for example, 2-methoxyethanol, 1,2-dimethoxyethane, 1,4-dioxane, 2-hydroxypropyl alkyl ethers and 2-butoxyethanol. Volatile solvents are preferred.

A large variety of bases may be used for reaction of the epoxy adduct of formula IV, as has been described hereinbefore with relation to $M^+$ in the general formula I. The epoxy adduct, the base and water are suitably stirred at a temperature of, for example, 80° to 100° C. The epoxy adduct of formula IV and the base are reacted in an equivalent ratio of imide to base which is not critical and may vary between wide ranges, for example between 1:4 and 4:1, although pH requirements may further affect the ratio chosen. For aqueous dispersions, pH values from 7 to 10 are generally preferred.

Thermosetting coating compositions may be prepared by combining a water-soluble resin composition according to the present invention, water and a cross-linking compound. Preferred are water-soluble cross-linking compounds of the aminoplast-type, such as alkoxylated reaction products of formaldehyde with melamine or benzoguanamine. Other cross-linking compounds are urea-formaldehyde resins, phenolformaldehyde resins, and blocked polyisocyanates. The usual weight ratio of the resin composition and the cross-linking compound are from 95:5 to 60:40.

Pigments, fillers, dispersing agents and other components known in the art of paint formulation may be added, and, if desired, small amounts of water-miscible volatile organic solvents. The water for use in the aqueous compositions is preferably purified, such as by distillation or demineralization.

The aqueous solutions of a resinous compound according to the present invention may be applied by a variety of methods known in the art, onto a variety of substrates, in particular metals such as bare steel, phosphated steel, zinc, tin plate (for can coating), and aluminium, to produced cured coatings of desirable thickness, from 2 $\mu$m upwards up to in general 40 $\mu$m. Application may be, for example, by spraying, dipping, roller coating, curtain coating or electrodeposition.

Curing can be performed by stoving, for example, at temperatures from about 150° to 220° C., with curing times varying from about 2 to 30 min.

The following examples further illustrate the invention.

The epoxidized novolac resin used in the following examples was derived from 2,2-bis(4-hydroxyphenyl)-propane and formaldehyde and contained 3.1 epoxy groups per molecule.

EPIKOTE ® 1001 is a tradename for a commercial solid polyglycidyl ether of 2,2-bis(4-hydroxyphenyl)-propane having an epoxy group content of 2105 meq/kg.

Butyl Oxitol ® is a tradename for a commercial 2-butoxyethanol.

Cymel ® 301 is a tradename for a commercial liquid hexamethoxymethylmelamine of American Cyanamid Company, and Cymel ® 1116 is a tradename for a commercial liquid mixture of hexamethoxymethylmelamine and hexaethoxymethylmelamine of the same company.

DEMUR ® Resin JM-38 is a name for a solution of the reaction product of an epoxidized novolac resin containing 4.1 epoxy groups per molecule and p-octylphenol in Butyl Oxitol ®; the reaction product contains 2 epoxy groups per molecule and the solution contains 66.7% by weight of solid material.

Amberlyst ® 15 is a tradename for a commercial ion exchange resin comprising a cross-linked and sulphonated styrene-divinylbenzene copolymer, of Rhom and Haas.

The unit "meq" means "milliequivalents".

The water used was demineralized.

The experiments were carried out in a glass reactor equipped with an anchor stirrer, thermocouple, reflux condenser and inlet tubes.

EXAMPLE 1

Epoxidized novolac resin (1107 g, 5591 meq epoxy), p-nonylphenol (633.6 g, 2880 mmol), tetramethylammonium chloride (0.87 g) and Butyl Oxitol ® (870.4 g) were placed in the reactor and the mixture obtained was heated at a temperature between 120° and 140° C. for 16 h. The defunctionalized novolac resin thus formed contained 1569 meq epoxy/kg.

A solution of succinic anhydride (100 g, 1 mol) in dimethylformamide (50 g) was added slowly to a stirred solution of p-aminophenol (109 g, 1 mol) in dimethylformamide (150 g) at a temperature between 25° and 30° C. After 1.5 h the reaction mixture was transferred to a film evaporator in which dimethylformamide (160 g) was separated off at a pressure of 0.05 bar and a temperature of 130° C. A solution of p-toluenesulphonic acid (2 g) in methanol (18 g) was added to the residue obtained, the temperature was increased to 170° C. and dimethylformamide and water were evaporated at a pressure of 13 mbar. The brown solid material thus obtained was dissolved in dimethylformamide having a temperature of 90° C., water was added to the solution until it became turbid, the turbid solution was allowed to adopt ambient temperature and the crystals obtained were filtered off. The N-(4-hydroxyphenyl)succinimide was obtained in a yield of 94% and with a purity of more than 99%.

A solution (254.7 g) of the defunctionalized novolac resin (169.8 g 259 meq epoxy) in Butyl Oxitol ®, a solution (184.1 g) of EPIKOTE ® 1001 (122.7 g, 259 meq epoxy) in Butyl Oxitol ®, N-(4-hydroxyphenyl)-succinimide (49.7 g, 259 meq imide), 2,2-bis(4-hydroxyphenyl)propane (29.7 g, 259 meq hydroxy) and Butyl Oxitol ® (39.7 g) were mixed in the reactor at ambient temperature, the mixture was heated to a temperature of 120° C. and at this temperature a solution (0.186 g) of tetramethylammonium chloride (0.093 g) in water was added. The mixture was allowed to react for 18 h at a temperature between 120° and 140° C., giving an adduct having an epoxy group content of less than 40 mmol/kg. After cooling to ambient temperature the product was highly viscous and contained 700 meq imide per kg imide-EPIKOTE ® adduct.

The reactor was charged with the imide-EPIKOTE ® adduct (149.93 g, containing 100 g of solid material, 70 meq imide), 1-dimethylamino-2-methyl-2-propanol (10.22 g, 70 mmol) and water (116.5 g). The mixture formed by the three components was kept under reflux for 5 h. The resulting binder had an acid value of 39 mg KOH/g and an aqueous solution thereof containing 36% by weight of solid material was clear.

The water-soluble binder (55.4 g aqueous solution containing 20 g of solid material) and Cymel ® 1116 (5.0 g) were thoroughly mixed in the reactor at ambient temperature, followed by addition of water (106.3 g) in small portions giving a clear curable coating composition having the following properties:

Content of solid material, % by weight: 15
Acid value, mgKOH/g: 39
pH: 9.0
Conductivity, µS: 650

The aqueous solution was deposited on a tin-coated can by anodic electrodeposition at 125 V for 2 sec at 20° C. The can was stoved at 200° C. for 5 min. The coating was 15 µm thick, was uniform and had an excellent appearance.

The sterilization resistance of the coating was determined by immersion in water for 90 min at 121° C. The result was excellent.

The pasteurization resistance of the coating was determined by immersion in a 2% by weight solution of lactic acid in water for 30 min at 80° C. The result was excellent.

The number of double rubs given to the cured coating with a cloth wetted with methyl ethyl ketone until the coating was wiped off, which number is referred to as "MEK rubs" was more than 100.

The cured coating had a negligible porosity, as appeared from measurements of electric conductivity with the aid of an aqueous solution of sodium chloride.

The same results were obtained after storage of the cured coatings for 4 weeks at 40° C.

EXAMPLE 2

A solution of 2,2-dimethylsuccinic anhydride (128 g, 1 mol) in dimethylformamide (150 ml) was added slowly for a time of 1 h at a temperature of 25° C. to a stirred solution of p-aminophenol (109 g, 1 mol) in dimethylformamide (150 ml) present in a reactor. By continuing the procedure as described in Example 1, N-(4-hydroxyphenyl)-2,2-dimethylsuccinimide was obtained in a yield of 70% and with a purity of more than 95%.

A reactor charged with DEMUR ® Resin JM-38 (68.6 g, 80 meq epoxy), N-(4-hydroxyphenyl)-2,2-dimethylsuccinimide (13.0 g, 60 meq imide) and tetramethylammonium chloride (0.015 g) was kept for 5 h at a temperature between 140° and 150° C., giving a solution having an epoxy group content of 50 mmol/kg solid material.

Then, sodium hydroxide (3.4 g, 85 meq) and water (150 g) were added and the mixture formed was kept under reflux for 5 h at a temperature of 100° C., giving a blue-colored clear solution of water-soluble binder having the following properties:

Content of solid material, % by weight: 25
Acid value, mg KOH/g: 57

The blue solution (100 g) was stirred at ambient temperature with 17 g of Amberlyst ® 15 which previously had been loaded with 1-dimethylamino-2-methyl-2-propanol (7.25 g). After 1 h stirring the Amberlyst ® 15 was filtered off, giving a clear solution of the binder.

The binder solution, Cymel ® 301 (6.25 g) and water (60 g) were thoroughly mixed in the reactor at ambient temperature, giving a clear curable coating composition containing 19% by weight of solid material.

The aqueous solution was deposited on a tin-coated can by anodic electrodeposition at 125 V for 2 sec at 20° C. The can was stoved at 200° C. for 5 min. The coating was uniform, had a thickness of 15 μm, excellent sterilization resistance, excellent pasteurization resistance and good flexibility.

EXAMPLE 3

A solution of 3-methyl-1,2-cyclohexanedicarboxylic anhydride (168 g, 1 mol) in dimethylformamide (75 ml) was added slowly to a stirred solution of p-aminophenol (109 g, 1 mol) in dimethylformamide (225 ml) at a temperature between 25° and 30° C. By continuing the procedure as described in Example 1, N-(4-hydroxyphenyl)-3-methyl-1,2-cyclohexanedicarboximide was obtained in a yield of 85% and with a purity of more than 98%.

A reactor charged with DEMUR ® Resin JM-38 (68.6 g, 80 meq epoxy), N-(4-hydroxyphenyl)-3-methyl-1,2-cyclohexanedicarboximide (15.5 g, 60 meq imide) and tetramethylammonium chloride (0.2 g) was kept for 5 h at a temperature of 145° C., giving a mixture having an epoxy group content of 225 mmol/kg.

The mixture was cooled to 100° C., an aqueous solution (32 g) of sodium hydroxide (80 mmol) was added and the mixture was allowed to react for 3 h under reflux and then to adopt ambient temperature. The solution was stirred at ambient temperature with 40 g of Amberlyst 15 which previously had been loaded with 1-dimethylamino-2-methyl-2-propanol (9.0 g). After 1 h stirring the Amberlyst 15 was filtered off, leaving a clear solution. To this solution Butyl Oxitol ® (5 g) and water (350 g) were added, obtaining a clear binder solution having the following properties:

Content of solid material, % by weight: 12.7
Acid value, mg KOH/g: 55

This clear binder solution (100 g) and Cymel200 301 (3.18 g) were thoroughly mixed at ambient temperature, giving a clear curable coating composition containing 15.4% by weight of solid material and having a pH of 10.2.

The aqueous solution was deposited on a tin-coated can by anodic electrodeposition at 50 V for 2 sec at 20° C. The can was stoved at 200° C. for 5 min. The coating thickness was 15 μm.

The coating was uniform and had a good flexibility.

EXAMPLE 4

A reactor charged with DEMUR ® Resin JM-38 (68.6 g, 80 meq epoxy), N-(4-hydroxyphenyl)succinimide (11.5 g, 60 meq imide) prepared as described in Example 1 and ethyltriphenylphosphonium iodide (0.06 g) was heated for 5 h at 145° C.

Then, the temperature was decreased to 100° C., a solution (32.0 g) of sodium hydroxide (3.2 g, 80 mmol) in water was added and the mixture formed was kept under reflux for 4 h at this temperature. The solution of water-soluble binder thus obtained was cooled to a temperature of 40° C. and stirred for 1 h at this temperature with 40 g of Amberlyst ® 15 which previously had been loaded with 1-dimethylamino-2-methyl-2-propanol (9.0 g). Then, water (350 g) was added, giving a clear solution of binder having the following properties:

Content of solid material, % by weight: 12.1
Acid value, mg KOH/g: 59

This binder solution (100 g) and Cymel ® 301 (3.03 g) were thoroughly mixed at ambient temperature, giving a clear curable coating composition containing 14.7% by weight of solid material and having a pH of 10.2

The curable coating composition was deposited on a tin-coated can by anodic electrodeposition at 50 V for 2 sec at 20° C. The can was stoved at 200° C. for 5 min. The coating thickness was 15 microns.

The coating was uniform and resisted 140 MEK rubs.

EXAMPLE 5

A reactor charged with DEMUR ® Resin JM-38 (68.6 g, 80 meq epoxy), N-(4-hydroxyphenyl)succinimide (11.5 g, 60 meq imide) prepared as described in Example 1 and ethyltriphenylphosphonium iodide (0.06 g) was heated for 5 h at 145° C.

Then, the temperature was decreased to 100° C., a mixture of 1-dimethylamino-2-methyl-2-propanol (8.6 g, 46 mmol) and water (150 g) was added and the mixture formed was kept under reflux for 5 h. Subsequently, water (200 g) was added, giving a clear binder solution having the following properties:

Content of solid material, % by weight: 13.3
Acid value, mg KOH/g: 45

This clear binder solution (100 g) and Cymel ® 301 (3.33 g) were thoroughly mixed at ambient temperature, giving a clear curable coating composition containing 16.1% by weight of solid material and having a pH of 8.7.

The aqueous solution was deposited on a tin-coated can be anodic electrodeposition at 50 V for 2 sec at 20° C. The can was stoved at 200° C. for 2 min. The coating had a thickness of 15 microns and was uniform.

What is claimed is:

1. An aqueous solution of a resinous compound, comprising an epoxy resin adduct which is an epoxy resin in which the 1,2 epoxy groups have at least in part been replaced with a group represented by formula I

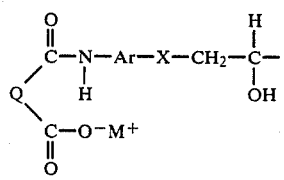

in which M+ is selected from alkali metal ions and onium ions, Q represents an organic bridging group having 2 or 3 carbon atoms in the bridge, Ar represents an arylene group and X is selected from S, O

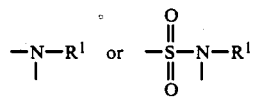

in which $R^1$ is selected from H and alkyl groups.

2. The aqueous solution of claim 1 in which $M^+$ represents an ammonium ion.

3. The aqueous solution of claim 2 in which the epoxy adduct has an epoxy group content of less than 500 meq epoxy/kg.

4. The aqueous solution of claim 2 in which $M^+$ represents a dimethyl-2-methyl-2-hydroxypropylammonium ion.

5. The aqueous solution of claim 1 in which Q in formula I stands for a group represented by formula V

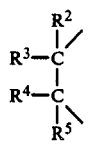
(V)

in which each of $R^2$, $R^3$, $R^4$ and $R^5$ is independently selected from substituted and unsubstituted hydrocarbon groups, hydrocarbonoxy groups, hydroxyl groups, halogens and hydrogen.

6. The aqueous solution of claim 5 in which any hydrocarbon or hydrocarbonoxy group represented by $R^2$, $R^3$, $R^4$ and $R^5$ has less than 13 carbon atoms.

7. The aqueous solution of claim 6 in which the hydrocarbon groups are alkyl groups.

8. The aqueous solution of claim 7 in which the alkyl groups have less than 5 carbon atoms.

9. The aqueous solution of claim 8 in which the alkyl groups are methyl groups.

10. The aqueous solution of claim 9 in which $R^2$ and $R^3$ represent methyl groups and $R^4$ and $R^5$ represent hydrogen atoms.

11. The aqueous solution of claim 4 in which Q in formula I forms part of a cyclic structure.

12. The aqueous solution of claim 11 in which the cyclic structure is carbocyclic and has 5 carbon atoms in the ring.

13. The aqueous solution of claim 11 in which the cyclic structure has 6 carbon atoms in the ring.

14. The aqueous solution of claim 13 in which the cyclic structure is a substituted or unsubstituted 1,2-cyclohexylene group.

15. The aqueous solution of claim 1 in which the epoxy adduct has an epoxy group content less than 100 meq epoxy/kg.

16. The aqueous solution of claim 14 in which the 1,2-cyclohexylene group is a 3-methyl-1,2-cyclohexylene group.

17. The aqueous solution of claim 1 in which Ar in the general formula I represents a p-phenylene group.

18. The aqueous solution of claim 1 in which X in formula I represents an oxygen atom.

19. An aqueous solution comprising the resin composition of claim 1.

20. A process for the preparation of an aqueous solution of a resinous compound, which process comprises
  (a) reacting an N-substituted imide having the general formula II

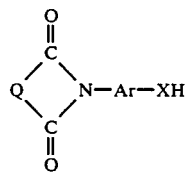
(II)

wherein Q is an organic bridging group having 2 or 3 carbon atoms in the bridge, Ar is an arylene group and X is selected from S, O,

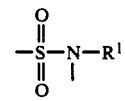

in which $R^1$ is selected from H and alkyl groups, with an epoxy resin having the general formula III

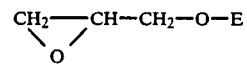
(III)

in which E represents the balance of the molecule of the epoxy resin, to prepare an epoxy adduct of the formula IV

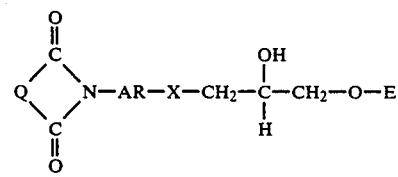
(IV)

in which Q, Ar and X have the same meaning as in the general formula II and E has the same meaning as in the general formula III, and
  (b) reacting the epoxy adduct of the formula IV in the presence of water with a base of the general formula $M^+(OH)^-$ in which $M^+$ is selected from alkali metal ions and onium ions.

21. The process of claim 20 in which the epoxy resin of the general formula III is a polyglycidyl ether of a polyhydric phenol.

22. The process of claim 21 in which the epoxy resin is a polyglycidyl ether of a dihydric phenol.

23. The process of claim 22 in which the polyglycidyl ether is a diglycidyl ether.

24. The process of claim 20 in which the epoxy resin is a polyglycidyl ether of a novolac resin.

25. The process of claim 21 in which the compound of formula II is reacted with a mixture of a polyglycidyl ether of a polyhydric phenol and an epoxy novolac resin.

26. The process of claim 21 in which the compound of the formula II is reacted with a mixture of the epoxy resin and a polyhydric phenol.

27. The process of claim 26 in which the polyhydric phenol is 2,2-bis(4-hydroxyphenyl)propane.

28. The process of claim 21 in which the compound of the formula IV is formed at a temperature in the range of from 60° to 200° C.

29. The process of claim 21 in which the reaction of the compound of the formula II with the epoxy resin of the formula III is carried out in the presence of an onium salt.

30. The process of claim 29 in which the onium salt is a quaternary ammonium or quaternary phsophonium salt.

31. A thermosetting coating composition comprising the aqueous solution of claim 1 and a crosslinking agent.

32. A process for coating an article which process comprises applying to the article the thermosetting coating composition of claim 31 and curing by action of heat.

33. An article comprising a cured coating applied by the process of claim 32.

* * * * *